April 13, 1954  C. SAGONA  2,674,806
DIAL MICROMETER
Filed May 7, 1953
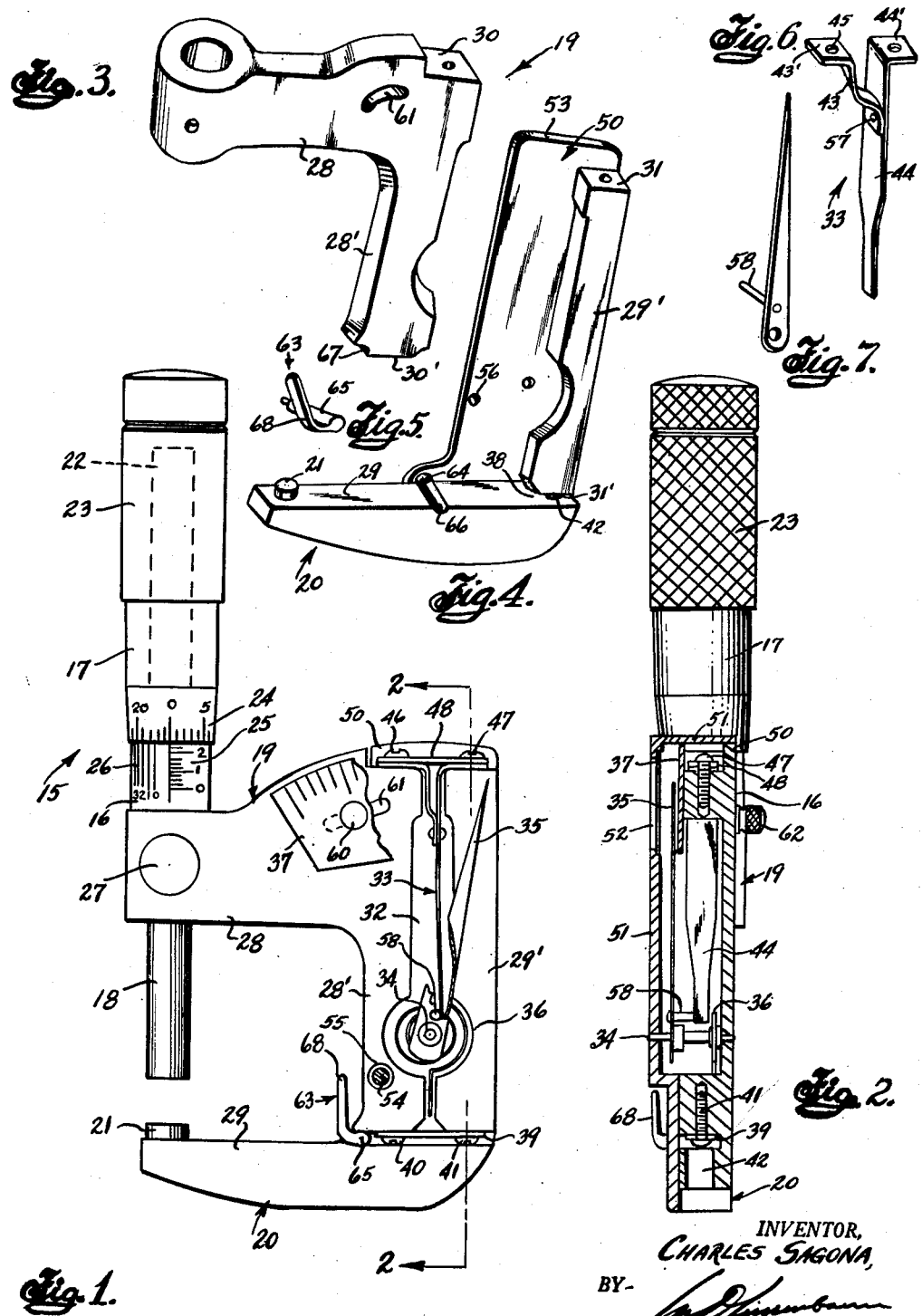
INVENTOR,
CHARLES SAGONA,
BY
ATTORNEY.

Patented Apr. 13, 1954

2,674,806

UNITED STATES PATENT OFFICE 2,674,806

DIAL MICROMETER

Charles Sagona, Brooklyn, N. Y.

Application May 7, 1953, Serial No. 353,467

15 Claims. (Cl. 33—147)

The present invention relates to micrometers used by machinists, toolmakers and inspectors.

The principal object of this invention is to provide a micrometer of novel and improved construction including a dial to indicate when the piece measured measures true to the micrometer setting.

Another object hereof is to provide a novel and improved micrometer of the character mentioned, which is independent of the feel of the user and automatically shows, when the micrometer is set for a particular measurement, whether or not the piece measured therewith is precisely in accordance with the micrometer setting when such piece is between and in contact with the spindle and anvil of such measuring implement. The present micrometer particularly shows when the piece measured is slightly larger or smaller than the micrometer setting and the extent of such difference, hence this implement is useful to show measurements between plus and minus tolerances.

A further object hereof is to provide a novel and improved micrometer of the class described, which can be set for a particular reading and used as a gage, affording means to increase the distance between its spindle and anvil to facilitate the entrance of a piece between them to be measured, without disturbing the micrometer setting; said means being adapted to be manipulated whereby the required distance between said spindle and anvil is restored in accordance with the set scale reading, unless prevented by a piece positioned between them measuring more than the setting.

Another object of this invention is to provide a novel and improved micrometer of the type set forth including the mentioned dial whose scale can be adjusted to true zero reading if need be.

A further object hereof is to provide a novel and improved pocket micrometer that is reasonably cheap to manufacture, has the features mentioned, is easily understood and used and which is efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a side elevation showing a pocket micrometer embodying the teachings of this invention.

Fig. 2 is a section taken at lines 2—2 in Fig. 1.

Fig. 3 is a perspective view of one of the frame parts on which is mounted the micrometer mechanism.

Fig. 4 is a perspective view of the second frame part which carries an anvil.

Fig. 5 is a perspective view of a pry means used to separate the frame parts a bit for purposes as will be explained.

Fig. 6 is a perspective view of a blade spring structure used herein to operate the pointer of an indicator dial.

Fig. 7 is a perspective view of such pointer.

In the drawings, the numeral 15 designates generally a micrometer mechanism with the usual barrel 16, thimble 17 and spindle 18 on a C-frame composed of the two frame parts denoted generally by the numerals 19 and 20; said micrometer mechanism 15 being carried on the frame part 19, while frame part 20 has the anvil 21. As is usual, the end of the spindle 18 is directly opposite the face of the anvil 21, and said spindle is movable towards and away from said anvil. Said spindle 18 is part of a screw 22 extending from a head 23 which carries the thimble 17, a tubular part concentrically positioned with respect to said screw, mounted on the barrel 16 as a slidable sleeve thereon; said barrel being the nut for said screw 22. The thimble and barrel carry the usual scales or graduations 24 and 25 respectively and if desired, the barrel may have a commonly known vernier scale arrangement 26. A set screw 27 through the frame may be included to hold the spindle 18 at any particular setting, as is well known.

Said C-frame parts 19, 20 are assembled in yielding relation to permit the spreading of the arms 28 and 29 of such C-frame; one of said arms being part of each of the frame members 19 and 20, respectively.

Each of the frame parts 19 and 20 is substantially L-shaped and they are associated to form a C-shape whereby one arm of each of said parts 19, 20 is respectively an arm of such C-shape while their other arms are positioned, one alongside the other. The arms of said C-shape are denoted as mentioned, by the numerals 28 and 29, while those arms of said parts 19, 20 which are alongside each other, are denoted respectively by the numerals 28' and 29'. The spindle 18 extends through arm 28 towards arm 29.

Frame part 19 presents a pair of opposite surfaces 30, 30', while frame part 20 presents the pair of opposite surfaces 31 and 31'. All four of said surfaces are preferably perpendicular to the axis of the spindle 18. The surfaces 30 and 31 are preferably co-planar. Likewise, the surfaces 30' and 31' are co-planar. The distance between the planes of surfaces 30, 30' is thus equal to the distance between the planes of the surfaces 31, 31'. There is a space 32 between those surfaces of the arms 28' and 29' which are opposite each other. Into this space, extend the joined arms of a blade spring structure denoted generally by the numeral 33. Also, said space, enlarged as shown provides room for mounting a shaft 34 carrying a pointer 35 and for a spiral torsion spring 36, which spring-loads said pointer towards one end of a graduated scale 37, which latter is mounted on one of the frame parts.

The surface 31' is a side of the slot 38 which affords space for blade spring strap 39 which rests on the surfaces 30' and 31' and is secured to each by a screw. These screws are denoted as 40 and 41, each of which has a clearance hole 42 in the frame part 20 into which holes, the heads of said screws 41, 40 may enter. The blades or spring straps 43 and 44, constituting the structure 33, have the bent over portions 43' and 44' respectively, which lie on the surfaces 30 and 31 respectively, and each such bent over portion is provided with a hole 45 for the screws 47, 46 which hold the parts 43 and 44 and the joinder spring strap 48 on the frame parts 19 and 20. The distance between the screws 46, 47 is preferably equal to the distance between the screws 40 and 41, and it is to be noted that screws 40 and 46 are in alignment, as are the screws 41 and 47. It is evident that frame part 19 is yieldingly mounted on the frame part 20 because of their joinder by the strap springs 39 and 48, for movement along a line parallel to the axis of the micrometer spindle 18, in a direction whereby the distance between the spindle end and the anvil 21 is increased slightly. In any event the opposite faces of said spindle and anvil do remain absolutely parallel.

The frame part 20 has an integral plate 50 and an associated removable cover plate 51 to act as a mounting means and housing for the pointer shaft 34 and all components residing within the space 32. The cover plate may be provided with a window 52 to expose the indicator scale 37 to view. Said cover plate may have a flange 51' to locate on the arcual edge 53, and said plate may be mounted by means of screws not shown. A screw 54 passing through a clearance hole 55 and engaged in the threaded hole 56 is provided to serve as a protective stop to limit the relative movement of the frame parts 19, 20.

The spring blades 43 and 44 form a Y-shape. Blade 43 is considerably shorter than 44 and is joined at an end to a point nearer one end of the blade 44, by the rivet 57. At any time there is a distortion of the spring straps 39, 48 from their normal rest position and upon their return to such normal rest position, the stem of said Y-structure 33, which is in contact with a pin 58 extending laterally from the swingably mounted pointer 35, will deflect and will thus cause movement of the spring-loaded pointer 35 across the scale card 37. The position of this scale card may be adjusted so that when the pointer is at unmoved rest position, said pointer shall indicate zero on said scale which is in the middle of said scale so that readings to one side of zero indicate plus tolerances and those to the other side indicate minus tolerances. For such adjustment, the scale card 37 is provided with a hole for a headed screw 60 which extends through the arcual slot 61 in the frame part 19 and is engaged exterior the device by a nut 62. When this nut is loosened and moved parallel with the slot 61, said scale card is moved. Tightening said nut 62 fixes the scale piece in place.

To use this micrometer device to measure a piece placed between the spindle and anvil, the thimble 23 is turned until the work rests on the anvil and is contacted by the spindle. Usually, the extent of turning at 23 depended on the feel of the user. Some turned until they could delicately feel that the work was in contact with both anvil 21 and the spindle 18. Others turned tighter. The readings in both instances were different. Even the same user measuring the same object twice, would get different readings in ordinary micrometers. All this is avoided with the present device because the true reading is at zero on scale piece 37. With such zero in the middle of the scale, for the pointer to be at zero, the frame parts 19, 20 need be given some relative movement by the piece measured, hence the blade spring straps 39, 48 will be in a stressed condition at such reading which is desirable to assure accuracy and mandatory to be able to read plus and minus tolerances.

When so used as a gage, there is provided a swingably mounted pry bar 63 supported in the arcual notches 66 and 67 and the bearing hole 64 in the frame parts 19 and 20 as shown. When this pry bar is turned, it will separate the said frame parts a bit. Such relative movement of said frame parts, will of course mean that the spindle 18 and the anvil 21 will move away a bit from each other thereby permitting the piece to be measured to be freely inserted between them and will also cause a movement of the pointer 35 because the spring blade straps 39, 48 have been flexed. Now upon release of said pry bar, it will automatically shift to normal rest position because of some relaxing of the blade spring straps 39, 48, the frame parts 19, 20 will move towards their original setting and if the piece being measured is within the scope of measurement of the scale 37, the pointer will indicate the dimension of the piece being measured.

This invention is capable of various forms and numerous applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a micrometer of the character described, a C-frame, a spindle mounted on one of the arms of said C-frame, for longitudinal movement towards and away from the other arm thereof; said C-frame comprising two L-shaped parts positioned whereby a leg of the first is spaced from and overlaps a leg of the second; the other legs of said L-shaped parts, constituting the arms of said C-frame respectively; each of said overlapping legs presenting a pair of spaced parallel surfaces in planes which are in angular relation with the longitudinal axis of the spindle; one of said surfaces on each of said legs being coplanar and the other of said surfaces on each of said legs being coplanar, blade springs, lying one on each coplanar pair of said surfaces and secured thereon whereby on movement of the arms of the C-frame towards or away from each other, the direction of the longitudinal axis of the spindle remains constantly parallel to its initial direction for all relative positions of said arms, a comparatively long blade spring piece, a comparatively short blade spring piece secured at one end to and intermediate the ends of said longer blade spring piece forming a Y-shaped structure therewith; a face of each of said spring pieces being opposite each other; the point of juncture of said two blade spring pieces being nearer to one end of the longer piece whereby the stem of said Y-structure is comparatively longer than the shorter of said blade spring pieces which is one of the branches of said Y-structure; the spaced ends of said branches being secured, one to each of said legs respectively, a spring-loaded pointer pivotally mounted on one of said frame parts, means on the pointer in contact with the foot of the stem of said Y-structure whereby on movement of said stem, the pointer will move about its pivotal axis of support and a graduated scale having at least one marking, mounted on one part of the C-frame and positioned to be traversed by said pointer.

2. The device as defined in claim 1, wherein the mentioned surfaces on the frame parts are perpendicular to the longitudinal axis of the spindle.

3. The device as defined in claim 1, wherein one of the overlapping legs is between the other of said legs and the spindle.

4. The device as defined in claim 1, wherein the major portion of the mentioned Y-structure is between the blade springs on the mentioned surfaces on the frame parts and wherein the axis of swing of the pointer and said major portion of the Y-structure are both in the space between the overlapping legs of the L-shaped frame parts.

5. The device as defined in claim 1, wherein the said scale means is a flat member slidable in its own plane and means to fix its position, carried on the leg the said scale is on.

6. The device as defined in claim 1, including a pry means contacting both of the mentioned frame parts and adapted when manually moved, to shift the L-shaped frame parts whereby the blade spring members carried on the mentioned surfaces on said frame parts, are flexed.

7. The device as defined in claim 1, including means on the frame parts for limiting their relative movement.

8. The device as defined in claim 7, wherein the mentioned means is a pin extending from one of the overlapping legs, into a hole in the other of said legs; said pin being laterally movable in said hole.

9. In a micrometer of the character described, a C-frame, a spindle mounted on one of the arms of said C-frame, for longitudinal movement towards and away from the other arm thereof; said C-frame comprising two L-shaped parts positioned whereby a leg of the first is spaced from and overlaps a leg of the second; the other legs of said L-shaped parts, constituting the arms of said C-frame respectively; each of said overlapping legs presenting a pair of spaced parallel surfaces in planes which are in angular relation with the longitudinal axis of the spindle; one of said surfaces on each of said legs being coplanar and the other of said surfaces on each of said legs, being coplanar, parallel blade springs lying one on each coplanar pair of said surfaces and so secured thereon whereby on movement of the arms of the C-frame towards or away from each other, said blade springs remain parallel to each other, and the direction of the longitudinal axis of the spindle remains parallel to its initial direction for all relative positions of said arms, a graduated scale having at least one marking, mounted on one part of the C-frame, a pointer movably mounted on one part of the C-frame, positioned for travel along said scale and means mounted partly on each part of the C-frame, connected with said pointer to move said pointer along said scale upon relative movement of said L-shaped parts.

10. The device as defined in claim 9, wherein the mentioned surfaces on the frame parts are perpendicular to the longitudinal axis of the spindle.

11. The device as defined in claim 9, wherein one of the overlapping legs is between the other of said legs and the spindle.

12. The device as defined in claim 9, wherein the said scale means is a flat member slidable in its own plane and means to fix its position, carried on the leg the scale is on.

13. The device as defined in claim 9, including a pry means contacting both the mentioned frame parts and adapted when manually moved, to shift the L-shaped frame parts whereby the blade spring members carried on the mentioned surfaces on said frame parts, are flexed.

14. The device as defined in claim 9, including means on the frame parts for limiting their relative movement.

15. The device as defined in claim 14, wherein the mentioned means is a pin extending from one of the overlapping legs, into a hole in the other of said legs; said pin being laterally movable in said hole.

References Cited in the file of this patent

UNITED STATES PATENTS

| Number | Name | Date |
| --- | --- | --- |
| 1,234,656 | Glover | July 24, 1917 |
| 2,469,613 | Subber | May 10, 1949 |